United States Patent
Hamel et al.

(10) Patent No.: US 8,861,779 B2
(45) Date of Patent: Oct. 14, 2014

(54) METHODS FOR ELECTRONICALLY ANALYSING A DIALOGUE AND CORRESPONDING SYSTEMS

(75) Inventors: Philippe Hamel, Caen (FR); Jean-Paul Audrain, Maltot (FR); Pierre-Sylvain Luquet, Conde sur Ifs (FR); Eric Faurot, Caen (FR)

(73) Assignee: Zero to One Technology (FR)

( * ) Notice: Subject to any disclaimer, the term of this patent is extended or adjusted under 35 U.S.C. 154(b) by 616 days.

(21) Appl. No.: 12/667,511

(22) PCT Filed: Jun. 25, 2008

(86) PCT No.: PCT/EP2008/005161
§ 371 (c)(1),
(2), (4) Date: Jun. 21, 2010

(87) PCT Pub. No.: WO2009/007011
PCT Pub. Date: Jan. 15, 2009

(65) Prior Publication Data
US 2010/0278377 A1    Nov. 4, 2010

(30) Foreign Application Priority Data
Jul. 6, 2007    (EP) .................................. 07290851

(51) Int. Cl.
*G06K 9/00* (2006.01)
*G10L 15/22* (2006.01)

(52) U.S. Cl.
CPC ............ *G10L 15/22* (2013.01); *G06K 9/00604* (2013.01)

USPC ........... 382/100; 362/117; 362/118; 362/128; 379/156

(58) Field of Classification Search
USPC ....... 382/128, 100, 118, 117; 348/77, E7.085
See application file for complete search history.

(56) References Cited

U.S. PATENT DOCUMENTS

| | | | |
|---|---|---|---|
| 2003/0097268 A1 | 5/2003 | Dinstein et al. | |
| 2006/0110008 A1 | 5/2006 | Vertegaal et al. | |
| 2007/0071206 A1 | 3/2007 | Gainsboro et al. | |
| 2008/0298571 A1* | 12/2008 | Kurtz et al. | 379/156 |
| 2010/0165092 A1* | 7/2010 | Yamaguchi | 348/78 |

FOREIGN PATENT DOCUMENTS

| | | |
|---|---|---|
| JP | 591394 A | 4/1993 |
| JP | 2002175538 A | 6/2002 |
| JP | 2004504684 A | 2/2004 |
| JP | 2005108206 A | 4/2005 |
| JP | 2005-252595 A | 9/2005 |
| JP | 200675348 A | 3/2006 |
| JP | 2006338529 A | 12/2006 |

(Continued)

OTHER PUBLICATIONS

"European Application Serial No. 07290851.0, Response filed Jul. 20, 2011 to Communication mailed Jan. 11, 2011", 9 pgs.

(Continued)

Primary Examiner — Ruiping Li
(74) Attorney, Agent, or Firm — Schwegman Lundberg & Woessner, P.A.

(57) ABSTRACT

The invention relates to a method for electronically evaluating a dialog between at least two persons comprising receiving audio data, analyzing the audio data to determine the reparation of utterances of the at least two persons in the course of the dialog and comparing the results of the analysis with predetermined communication patterns.

11 Claims, 13 Drawing Sheets

(56) References Cited

FOREIGN PATENT DOCUMENTS

Figure 1:
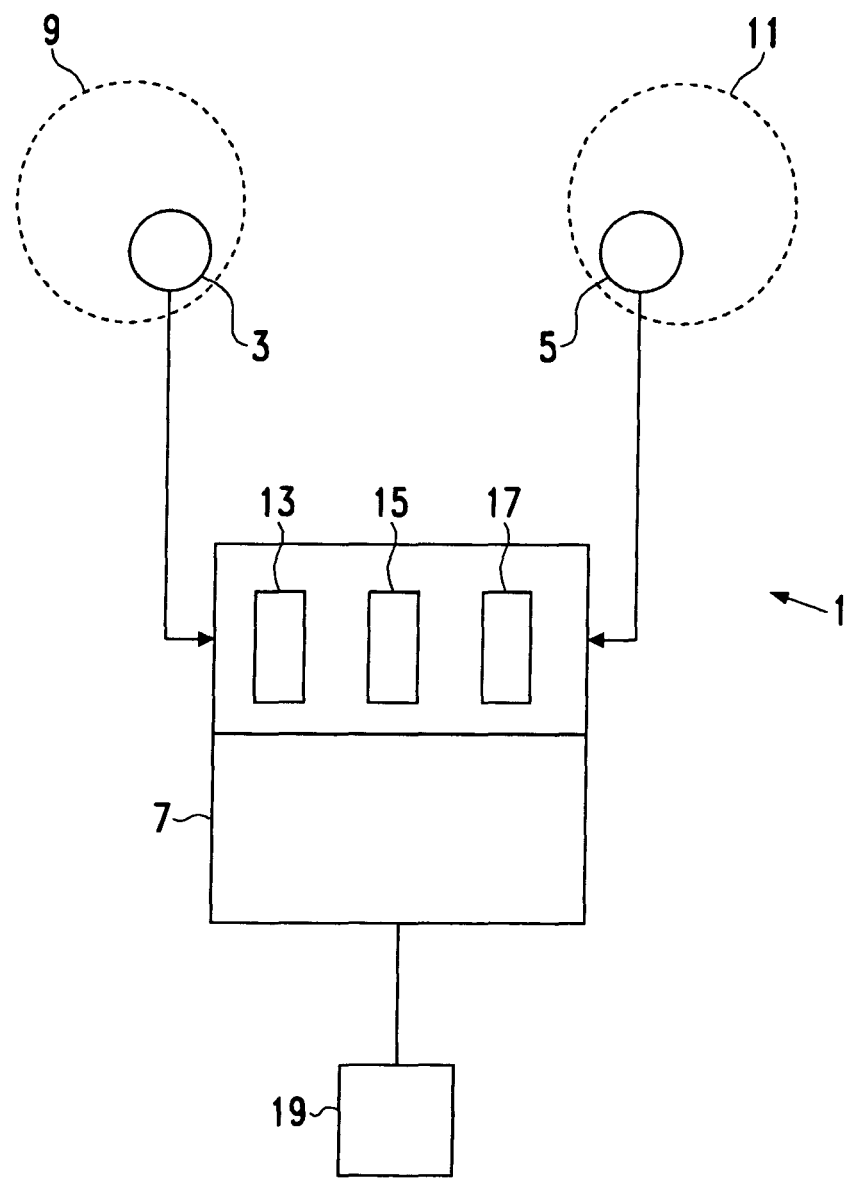

| JP | 2007-003700 | A  | 1/2007  |
|----|-------------|----|---------|
| JP | 2007293818  | A  | 11/2007 |
| WO | WO-02/09025 | A1 | 1/2002  |
| WO | WO-2006/124945 | A1 | 11/2006 |

OTHER PUBLICATIONS

"European Application No. EP 07 29 0851, European Search Report", (Mar. 10, 2008), 3 pgs.

"International Application No. PCT/EP2008/005161, International Search Report", (Nov. 3, 2008), 5 pgs.

"Master d'Informatique M2-IAD Projets 2005-2006", *Department Informatique, Universite de Caen, France*, URL:http://www.info.unicaen.fr/M2-IAD/promo05-06/projets/index.php, (Dec. 10, 2007), 35 pgs.

Machrouh, Joseph, et al., "Visual Interaction in Natural Human-Machine Dialogue", *Perception and Interactive Technologies Lecture Notes in Computer Science; Lecture Notes in Artificial Intelligence*, vol. 4021, (2006), 152-163.

"European Application Serial No. 07290851.0, Communication mailed Jan. 11, 2011", 5 pgs.

"International Applicaton No. PCT/EP2008/005161, Written Opinion mailed Nov. 3, 2008", 8 pgs.

Gullberg, M., "Chapter 32—Eye Movements and Gesturs in Human Face-to-face Interaction", *The Mind's Eye: Cognitive and Applied Aspects of Eye Movement Research*, Elsevier Science BV, (2003), 685-703.

Morency, L.-P., et al., "Conditional Sequence Model for Context-Based Recognition of Gaze Aversion", *Proceedings of the 4th International Conference on Machine Learning for Multimodal Interaction (MLMI 07)*, LNCS 4892, (2007), 11-23.

"Australian Application Serial No. 2008274651, Office Action mailed Jan. 16, 2012", 3 pgs.

"European Application Serial No. 07290851.0, Communication mailed Nov. 23, 2011", 3 pgs.

"European Application Serial No. 07290851.0, Response filed Feb. 9, 2012 to Communication mailed Nov. 23, 2011", 74 pgs.

"International Application No. PCT/EP2008/005161, International Preliminary Report on Patentability dated Jan. 12, 2010", 9 pgs.

"Japanese Application Serial No. 2010-513750, Office Action mailed Nov. 6, 2012", (w/ English Translation), 9 pgs.

"Japanese Application Serial No. 2013-016863, Office Action mailed Dec. 10, 2013", w/English translation, 10 pgs.

"Korean Application Serial No. 10-2010-7002619, Office Action mailed May 11, 2014", w/English Summary, 8 pgs.

\* cited by examiner a)

b)

c)

d)

e)

METHODS FOR ELECTRONICALLY ANALYSING A DIALOGUE AND CORRESPONDING SYSTEMS

PRIORITY CLAIM TO RELATED APPLICATIONS

This application is a national stage application under 35 U.S.C. §371 of PCT/EP2008/005161, filed Jun. 25, 2008, and published as WO 2009/007011 A1 on Jan. 15, 2009, which claims priority to European Application No. 07290851.0, filed Jul. 6, 2007, which applications and publication are incorporated herein by reference and made a part hereof in their entirety, and the benefit of priority is claimed thereto.

The invention relates to methods for electronically analysing a dialogue and corresponding systems to carry out the methods.

Such a method is known from US2003/0097268 disclosing a system and method for analysing and evaluating human behaviour stigmata. The described method finds its application in the field of medicine, in particular in the analysis of interviews of psychiatric patients. To do so, audio and visual output emanating from a patient is recorded and using a computing device a diagnosis, treatment information or prognostics are output to support the work of a medical doctor.

However, the known method is not applicable to situations in which not only one person, like a patient, has to be analysed but in which more than one person intervene. Such a situation e.g. occurs when analysing a sales conversation or a job interview. Up to now, a camera was typically used to film a conversation or an interview in order to support the analysis. A film taken was then viewed by a user, e.g. a teacher of a sales seminar, and reviewed and discussed with the participants of the dialogue. During the discussion, the user pointed out the strengths and weaknesses of the individual participants concerning their behaviour with respect to the other person participating in the discussion or the interview.

As each participant is filmed for about 30 minutes, the analysing person had to spend a lot of time in watching the films of each participant and the time reserved to explain how the participants could improve their commercial techniques or improve their hiring chances remained relatively low.

It is therefore one object of the present invention to provide a method and device, which automatically supports the analysis of a dialogue.

This object is achieved with the features of the methods described herein. A dialogue between one or more persons comprises different identifiable communication pattern which can—from the perspective of one person (in the following identified as the first person)—be identified as "listening", "reformulating", "reacting", "expressing" and "silence". Each communication pattern is characterized by the way the utterances of the dialoguing persons are distributed among them:

"listening": the first person is silent whereas the other one speaks,

"reformulating": the other person is mainly talking, whereas the first person intervenes shortly from time to time, "reacting": the first person is talking, but the other person interrupts to intervene, "expressing": the first person is mainly talking, whereas the other person intervenes shortly from time to time, "silence": nobody is talking.

By analysing the received audio data such that the repartition of the utterances is extracted electronically out of the received data, the various verbal communication patterns of a dialogue can be automatically identified and output to a user of a system realising the method according to the invention. Based on this extracted additional information concerning the dialogue, an evaluation of the captured dialogue can be established and one can especially point towards communication patterns that are not used, not enough used or too much used by the person(s) participating in the dialogue.

In this context and throughout the application the term "electronically evaluating" relates to automatically extracting properties of the interactions occurring during the dialogue using electronic means. Thus the extraction is not based on a manual analysis by simply relistening the utterances of the participants.

The object of the invention is also achieved with the methods described herein and which also relates to a method for automatically, in particular electronically, evaluating a dialogue between at least two persons, comprising the steps of a) receiving audio data comprising a dialogue between the at least two persons, and d) identifying predetermined interaction phases in the course of the dialogue based on a moving average value of the speaking time of one person participating in the dialogue.

Commercial dialogues, in particular sales conversations, comprise typical interaction phases, namely at the beginning a presentation phase and at the end conclusions. In between these phases, a discovery of needs phase during which the sales person is listening to the buyer, an argumentation phase during which the sales person predominantly speaks to propose it product and a response to objections phase during which the buyer makes objections concerning the proposed product and the buyer has to counter them with arguments, may occur. Depending on the context, the dialogue may comprise all these phases or only some of them. These phases will be explained in more detail further down.

With this additional step the method automatically provides the user with supplementary information, in particular the interaction phases that are present or not and/or how long these phases are in relation to the total dialogue. This is important information, which can be used to train the person(s) participating in the dialogue to improve its/their sales techniques or their hiring chances. The moving average of the speaking time of one speaker is a suitable and reliable parameter to automatically identify the various phases according to the invention, as it is an indication about who speaks more, which in turn is an indication about the phase the dialogue is currently in. In addition, this analysis can be carried out during the dialogue and therefore provides quick results.

According to a preferred embodiment the two methods described above can be combined, thus more valuable information about the quality of the dialogue and the communication skills of the persons can be automatically extracted out of one audio data set. Of course, the moving average of the speaking time could be obtained out of the distribution of the utterances.

Advantageously, the identification can be based on the detection of at least one transition from one interaction phase to another, wherein a transition is detected by determining a first moment at which the moving average value passes a first limit value and a second moment at which the moving average value passes a second limit indicating the presence of a transition at the second moment. The passage of a first limit confirms the presence of a certain phase. By providing a second limit, indicating that the distribution of the utterances is going to change and which also needs to be past, the method concludes that the phase identified at the first moment ends at the second moment. This way of proceedings stabilizes the analysis and detection of the different interaction phases.

Preferably, the first limit can be in a range of 60 to 80%, in particular 65%, for phases during which the one persons speaks more than the other one and is in a range of 20% to 40%, in particular 35%, for phases the one persons speaks less than the other one, the second limit is in a range of 45 to 55%, in particular 50%. For these limits the determination of the transition from one phase to the next one is stable.

Advantageously the average value can be calculated over a time duration of about 3% to 10% of the total duration of the dialogue, in particular 5% of the total duration. These values provide a stable determination for the identification of the transition from one phase to the next one.

Advantageously, the above described methods can further comprise a step e) of determining whether the duration of the interaction phases are within predetermined time intervals. The method therefore not only allows a qualitative automatic measure of the quality of a dialogue, but also a quantitative measure, allowing the person analysing the dialogue to point towards phases that took too long or were not long enough.

According to a preferred embodiment step b) of the inventive method can further comprise analysing the audio data to identify predetermined words in the utterances of the at least two persons, in particular only in the utterance of one predetermined person. This additional information further improves the quality of the automatically generated evaluation of the dialogue. The appearance of specific vocabulary immediately indicates whether the persons are using the vocabulary best suited to the situation. For instance, in case a sales person sells a new product, the predetermined words typically relate to that product; e.g. the trade name, special properties and/or advantages. In case of evaluating the sales capacities of a sales person, it can be sufficient to only analyse the utterances of only that person of the dialogue.

Preferably, the method can further comprise a step f) of analysing, in particular counting, the occurrence of the predetermined words in the identified one or more interaction phases respectively. In the above-mentioned sales conversation, the specific vocabulary concerning the product to be sold should predominantly appear in the "argumentation" and the "response to the objections" phase. If this is not the case, the dialogue is not well organised by the sales person. This important information is automatically provided by the inventive method and thus further supports the user of the system in evaluating dialogues.

Advantageously, the audio data can comprise a plurality of data streams from different microphones, in particular each microphone can be assigned to only one person of the at least two persons and can be configured such that the signal intensity from the one person, when speaking, is larger than the signal intensity of the remaining persons. The provision of more than one microphone facilitates the determination of the repartition of the utterances, as to identify who is currently speaking, it is sufficient to analyse the signal intensity of the audio data streams by assuming that the signal intensity exceeds a certain threshold, when the person closest to the microphone is talking and that the noise and signal arising from the other person/s in sum do not exceed that threshold.

Preferably, the inventive method can further comprise a step g) of receiving video data showing the at least two persons at least partially, and a step h) of analysing the video data to determine whether a visual interaction between the at least two persons occurs. Under the term "visual interaction", it is understood that at least one of the persons participating in the dialogue looks at another person. The evaluation of the dialogue is thus not only based on the interaction between the persons in the audio data, but, in addition, on the visual interaction between the at least two persons, which is also automatically, in particular electronically, determined using the video data. Thereby the user obtains a more complete dataset evaluating the dialogue.

The object of the invention is also achieved with the methods described herein. Not only the analysis of audio data supports a person in his analysis of dialogues, but also video data on its own provide valuable information about the correct behavior of persons during a dialogue, like a sales conversation. The automatic and electronic determination of a presence or absence of visual interaction can support the user, as the visual interaction provides information about non-verbal communication channels, in particular indicates the interest of the one person by the statements of the other person or whether one person is able to attract the intention of the other person.

Preferably, in the above described methods, step h) can further comprise determining whether the at least two persons look at each other by detecting the position of the irises of the at least two persons. A situation where a person looks at the other one, is in the following defined as "focalisation", and describes a state in which the verbal information flow from one person to the other is sustained by the non-verbal interaction. Therefore the user gets a more detailed analysis of the dialogue in case this type of interaction is provided. In a sales conversation the important information concerning focalisation is a) how long did the sales person look at the buyer, b) how long did the buyer look at the sales person, and c) how long did they look at each other. When the protagonist behave the same way concerning focalisation, it is considered that both are in a synchronized state.

Advantageously, the above described methods can further comprise a step i) of analysing micro movements of the eyes of the at least two persons to determine whether the direction of the micro movements of the eye are in the same mode. The micro movements play a role when a lack of focalisation is observed. It is known that micro-movements of the eye exist and that they provide information about a person's perception. Furthermore it is known that also a synchronisation of the micro movements between two persons during the dialogue is possible and advantageous for the outcome of a conversation. By automatically and electronically detecting the micro movements of the eyes of the participants of a dialogue and the determination whether the modes are synchronised provides the user of the method with an additional parameter, which he can exploit in his evaluation. For instance, in the absence of a synchronisation during a sales conversation the user of the method, e.g. a teacher in a seminar, can point towards that fact and indicate that the vendor does not use a possible communication tool. In this context, micro movements means the movement of the iris into one of the following six directions of the eye: upper left, upper right, left, right, downwards left and downwards right.

According to a preferred embodiment, the above described methods can comprise determining whether the direction of the micro movements of the eye are in the same mode in at least one predetermined interaction phase. During a sales conversation the different phases do not all have the same importance concerning the success of the negotiation, thus once the different interaction phases have been identified out of the audio data stream, it becomes possible to relate the synchronized—concerning both synchronisation by focalisation and by the same mode in the micro movements—and non-synchronized periods to these phases. Thus it becomes possible to provide the user with even more data about the dialogue.

Preferably, step h) can comprise the steps of h_1) identifying visual features in a picture of the video data to determine the zone of the picture showing at least a part of the face of at least one of the two persons, and h_2) isolating stripes, in particular vertical stripes, in the zone, and h_3) identifying eye zones in the stripes. By dividing the analysing step in three distinct steps, the process of determining whether a visual interaction between the at least two persons occurs can be realized in a reliable and fast way. Preferably the pictures show both eyes of the at least one person.

According to the invention a method is provided which in a simple but reliable way enables the identification of an eye zone in video data based on the splitting up of the analysis in a plurality of different steps. This method comprises the steps of h_1) identifying visual features in a picture of the video data to determine the zone of the picture showing at least a part of the face of at least one of the two persons, and h_2) isolating stripes, in particular vertical stripes, in the zone, and h_3) identifying eye zones in the stripes.

Preferably, step h_1) of the previously described methods can comprise determining at least one zone of the picture having colour of skin and choosing the biggest zone among the determined zones. In this case the video data stream is a colour video data stream and by providing a background with a different colour, the step of identifying visual features is simplified. A suitable mask to extract pixels with skin colour can be applied to the image to obtain the desired data.

Advantageously, step h_2) of the previously described methods can comprise identifying intensity valleys in the biggest determined zone, wherein the intensity of the pixels in the valleys is less than a predetermined limit value, wherein the limit value is a function of the maximum intensity value in the zone, and wherein each stripe comprises one valley. The intensity valleys in the image treated with a skin colour mask are due to the presence of the eyes and are thus a reliable indicator for finding the position of the eyes. In case only one valley is identified the method concludes that at most one eye position can be determined.

Preferably, the methods can further comprise identifying contours in the stripes, in particular by transferring the stripes in a grey-scale format. Once having identified the stripes, only these regions are treated and the grey-scale gradient in each pixel is determined to identify contours. Thus advantage is taken from the fact that the eyes of a person build up contours, which can be easily identified in the grey-scale format.

According to a preferred embodiment, step h_2) can further comprise the search of candidate centres of the determined contours by searching for circles susceptible to correspond to the iris, in particular by weighting their grey scale intensity in the video data in the contours with a predetermined colour, preferably black. This analysis is based on the hypothesis that the iris is darker than other features of the face and allows distinguishing between intensity valleys due to the eyes and intensity valleys due to other artefacts like for example the presence of hairs or other particular facial features like wrinkles and therefore is a reliable method to identify the stripes containing an eye zone.

Preferably, the methods can further comprise a step h_4) of identifying the position of the iris in an eye zone, by searching for circles susceptible to correspond to the iris, in particular by weighting the grey scale video data in the contours with a predetermined colour, preferably black, like described above. The position of the iris will provide the necessary information to know whether a visual interaction exists during the dialogue and in particular in case the positions of the irises of two persons are identified whether the two persons look at each other.

Advantageously, for at least the subsequent picture of the video data only step h_4) can be repeated to identify the position of the iris in an eye zone, unless no iris position is detectable. This has the advantage that the calculation process becomes faster, as steps h_1) to h_3) do not need to be repeated for each picture. These steps are only carried out, in case no iris position is detected during the processing of step h_4).

According to a preferred embodiment, the video data can comprise a plurality of data streams from different cameras located at different positions with respect to the persons participating in the dialogue. This arrangement provides sufficient data to establish a three dimensional analysis from the two dimensional video data and thus further improves the determination of visual interaction information, in particular, the identification whether two persons look at each other.

Preferably, each camera can capture only one person. This further facilitates the data treatment and thus speeds up the process to identify, as it is ensured that each data stream comprises only one person, thus one has only to search for two stripes comprising contours which could correspond to eye contours. Preferably, the cameras are arranged such that each camera films a person from or close to the angle of view of another person.

Advantageously, step h) and/or i) can be carried out in a time interval being shorter than the time interval between two pictures of the video data. This ensures that immediately after terminating the dialogue, the user of the method has the necessary information about the behaviour of the person/s participating in the dialogue.

Preferably, the methods can further comprise a step j) of storing the results of steps c) and/or d) and/or h) and/or i). Thus the user can access the results whenever needed. It is in particular advantageous to store the results in a database, which allows the comparison between different dialogues of the same person/s and/or different persons whose dialogues have been evaluated. The evaluation of the sales techniques of one person can thus be followed over several training sessions.

The invention also relates to a computer program product, comprising one or more computer readable media having computer-executable instructions for performing the steps of the methods as described above. The invention furthermore relates to a storage media product comprising the computer program product.

The invention furthermore relates to systems for carrying out any of the above-described methods.

Preferably, the data-processing device can be further configured to identify predetermined words in the utterances of the at least two persons. The appearance of specific vocabulary immediately indicates whether at least one of the persons participating in the dialogue is using the vocabulary best suited to the situation. For instance, in case a sales person sells a new product, the predetermined words typically relate to that product; e.g. its trade name, special properties and/or advantages.

Advantageously, one microphone can be provided per person participating in the dialogue, wherein the microphone can be configured such that the signal intensity from the one person, when speaking, is larger than the signal intensity of the remaining persons. This facilities the data analysing, as to identify whether a person speaks or not can simply be determined by checking whether the signal captured by the corresponding microphone is above a certain threshold below which background noise or utterances of other persons are situated.

According to a variant, the system can further comprise at least one video camera for capturing video data showing the at least two persons during the dialogue at least partially and wherein the processing device is further configured to determine whether a visual interaction between the at least two persons occurs during the dialogue. It thus becomes possible to analyse both verbal and non-verbal interactions to obtain a more detailed evaluation of the profile of a person participating in the dialogue. In particular, synergistic effects between verbal and non-verbal interactions and communication channels can be extracted, e.g. by combining the information concerning the repartition of utterances with the focalisation parameter and the micro-movements to identify phases in which both participants are in a synchronized state, thus show the same kind of behaviour when listening and speaking, than the other person.

Advantageously, the processing device can further be configured to detect the position of the eyes, in particular the irises, of a person in video data comprising a plurality of subsequent pictures, by identifying visual features in a picture to determine the zone of the picture showing at least a part of the face, in particular at least both eyes, of the person, by isolating stripes, in particular vertical stripes, in the zone, and by searching for eye zones in the stripes if more than one stripe has been isolated in step h_2). By separating the analysing step into a plurality of steps the overall time necessary to determine the position of the eyes can be shortened.

According to a preferred embodiment, for each person participating in the dialogue one video camera can be provided, and wherein the video cameras are arranged such that each camera can only capture one person. This further facilitates the data treatment, as it is ensured that in one data stream only one person can be present, thus one has to search only for one pair of eyes.

Figure 2:
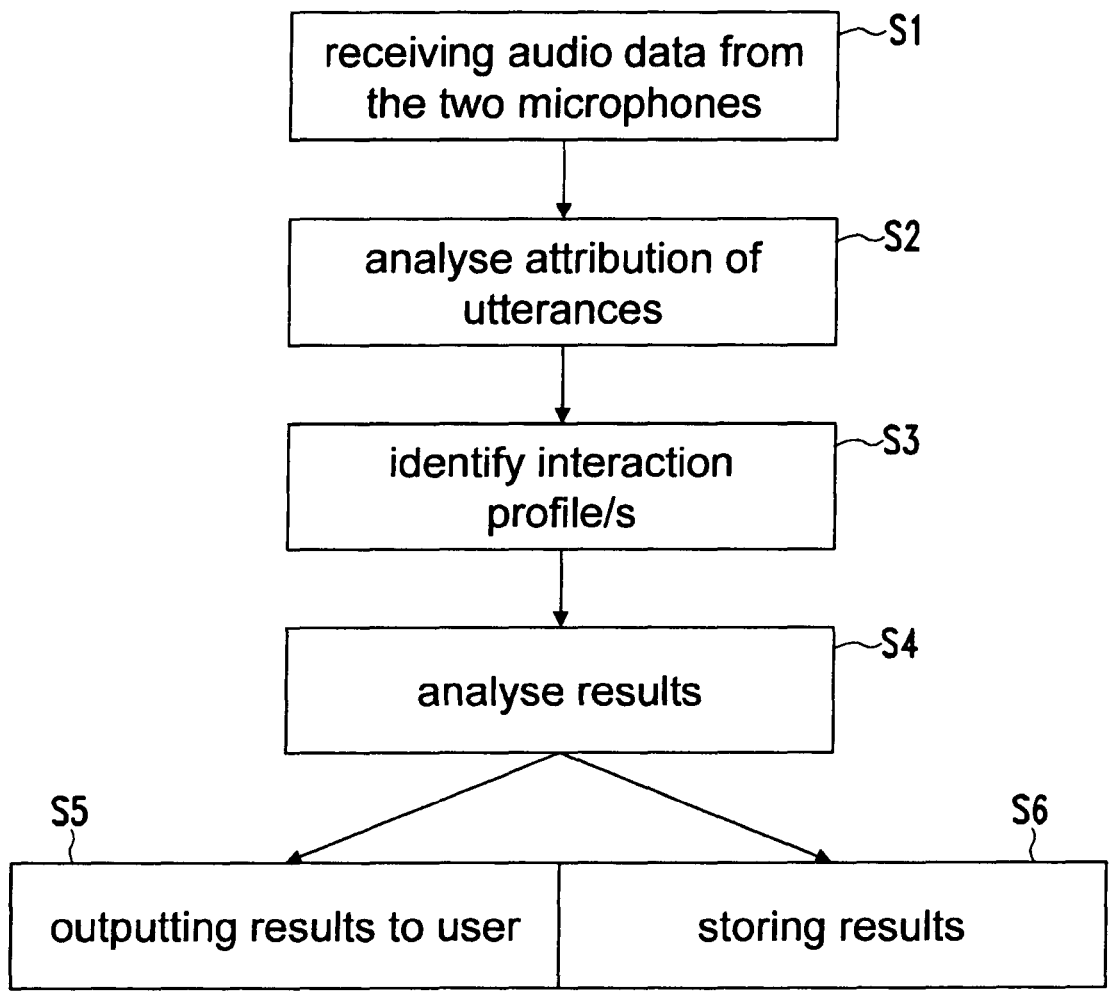
Figure 3:
Figure 3:
Figure 3:
Figure 3:
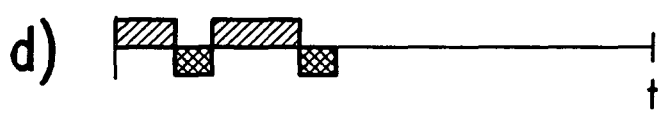
Figure 3:
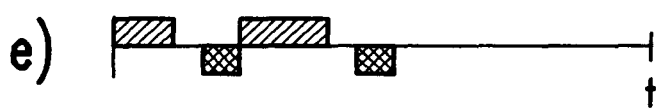
Figure 4:
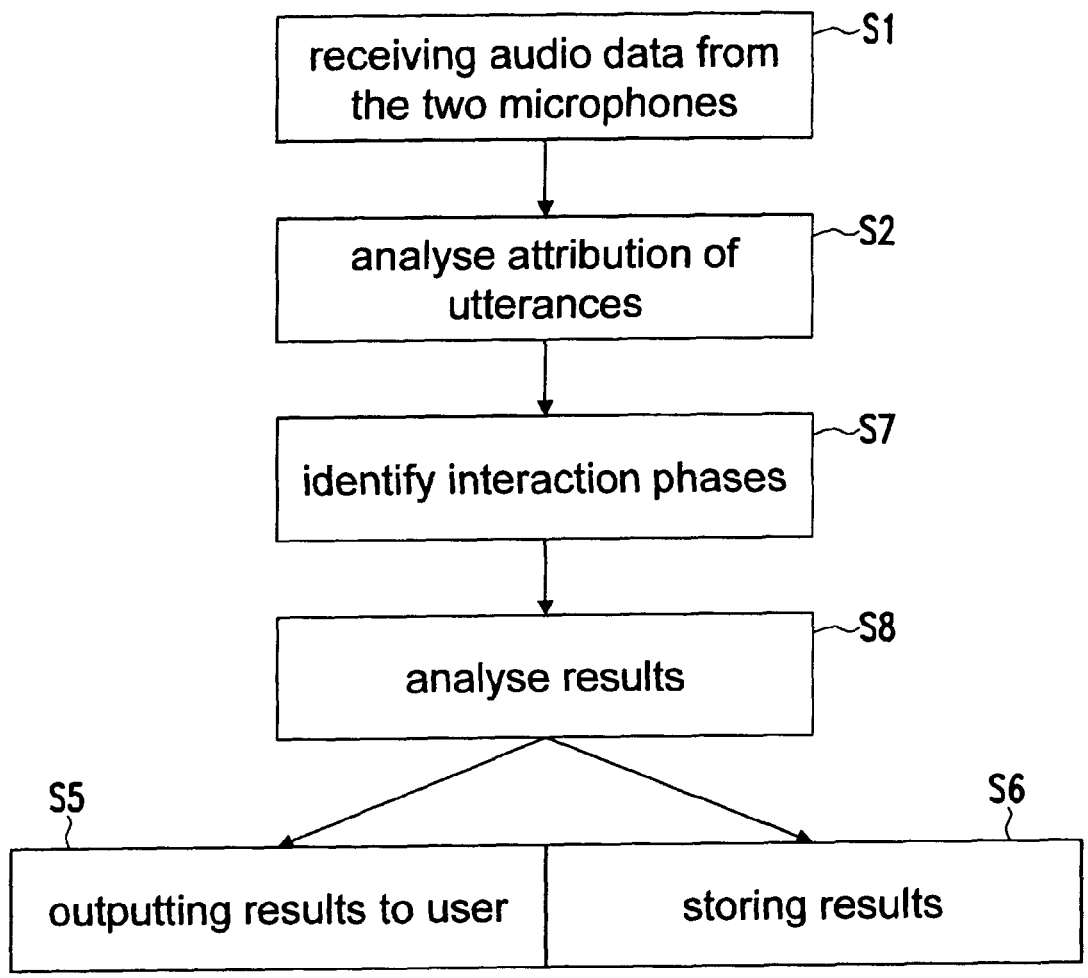
Figure 5:
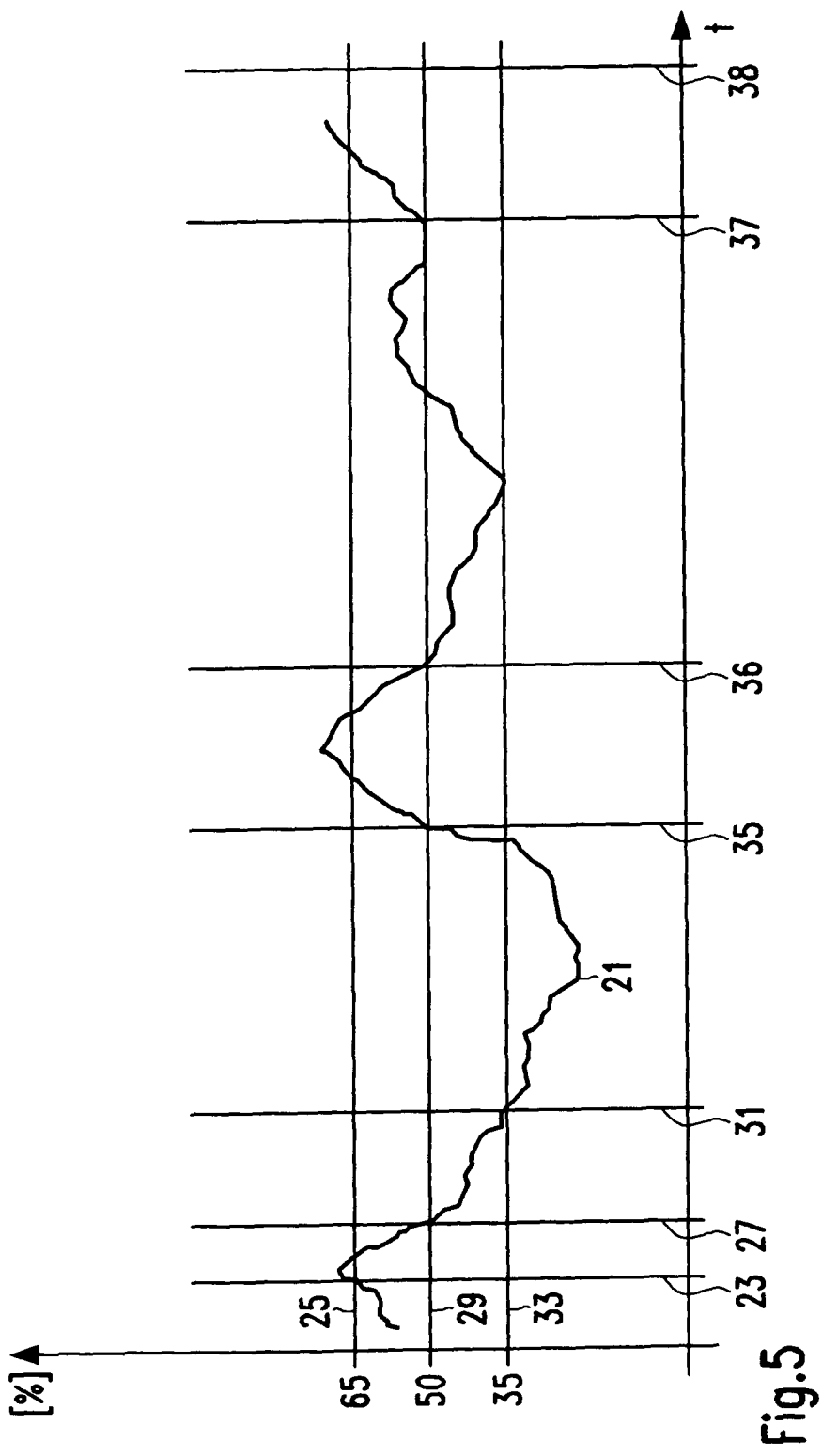
Figure 6:
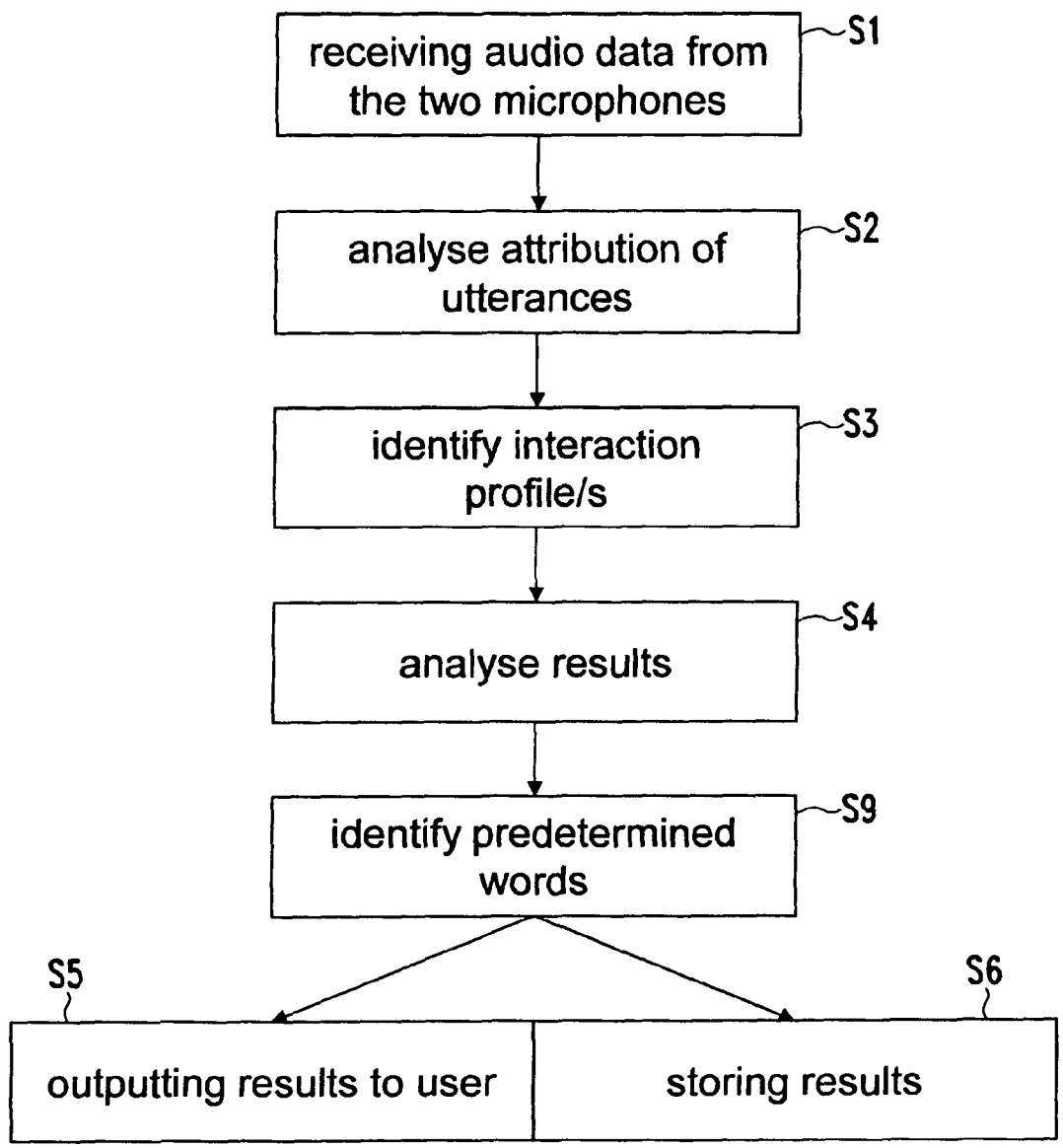
Figure 7:
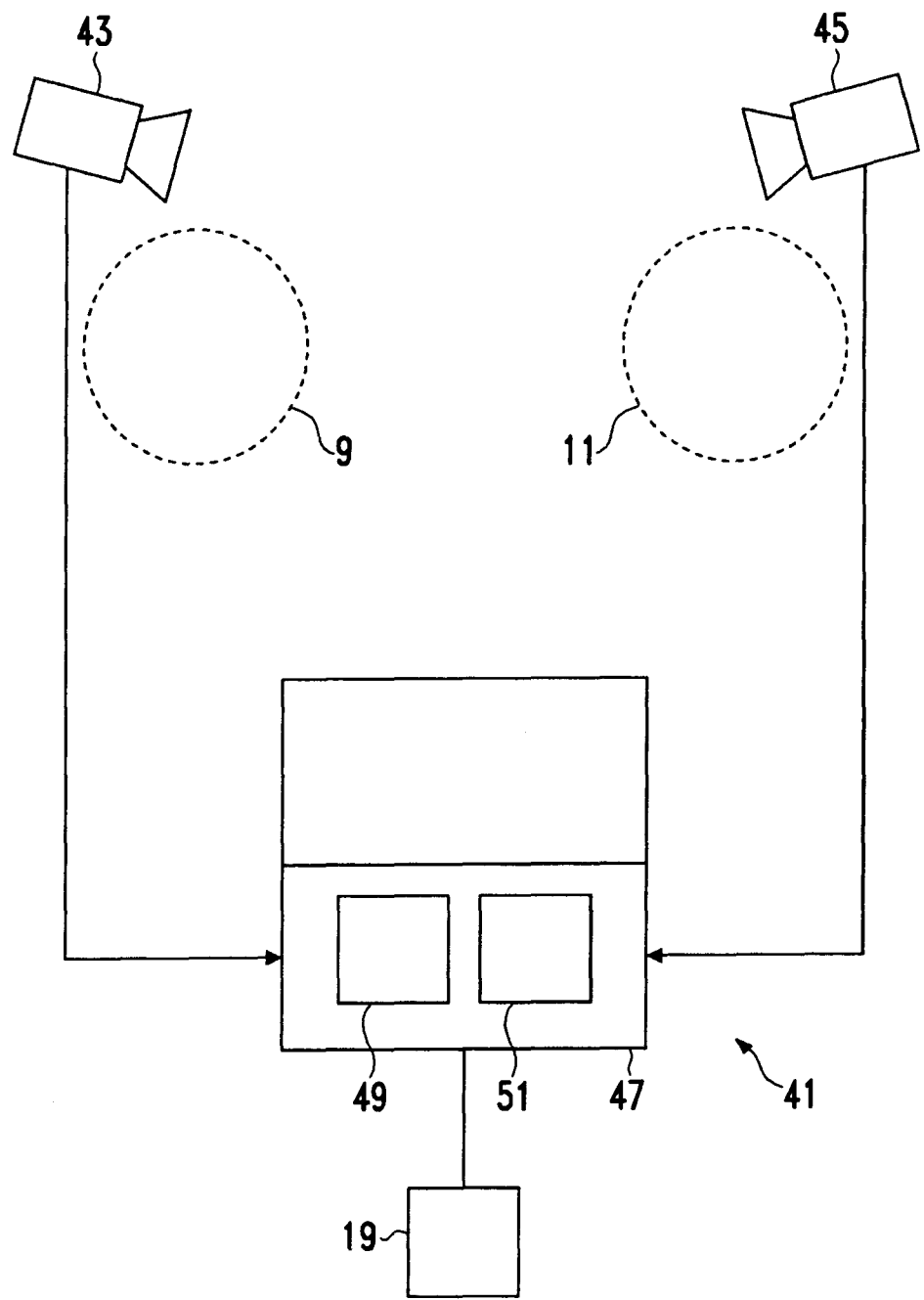
Figure 8:
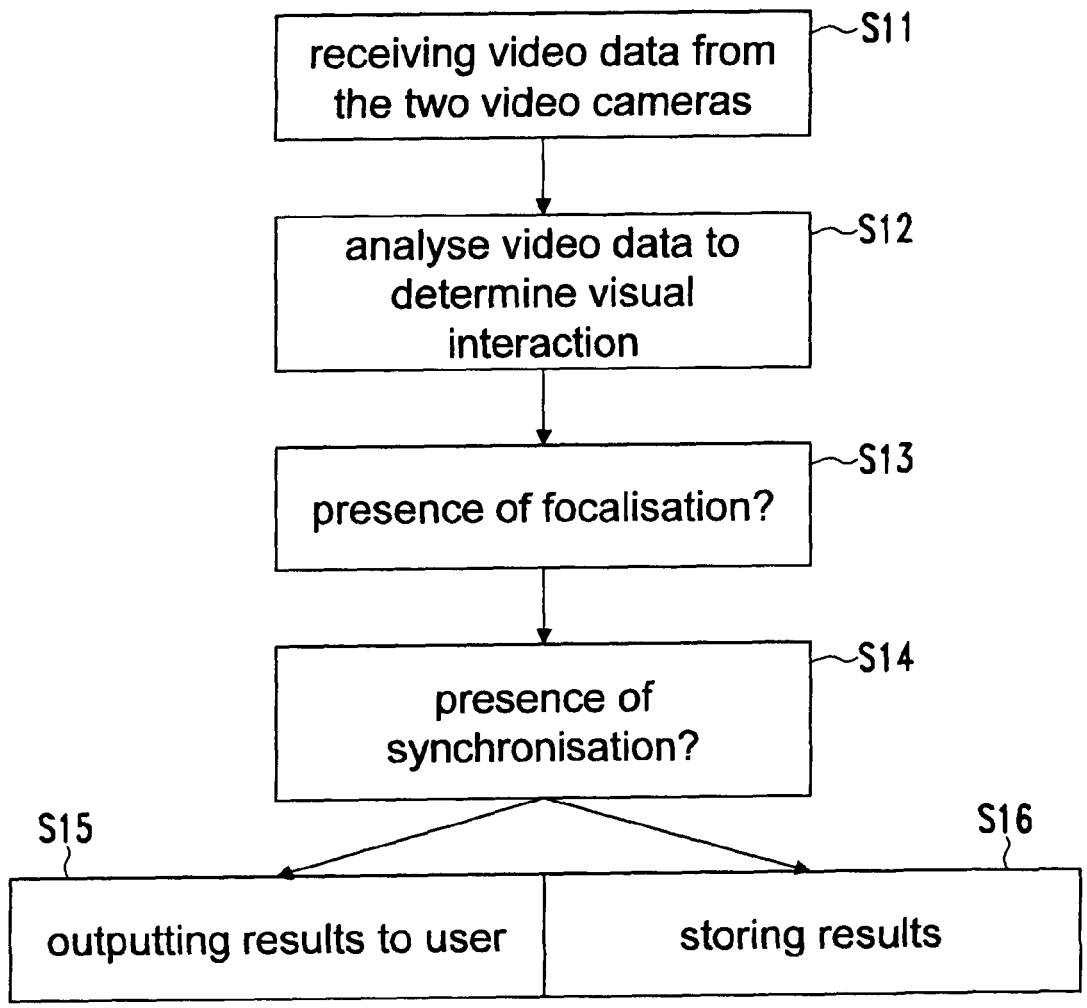
Figure 9:
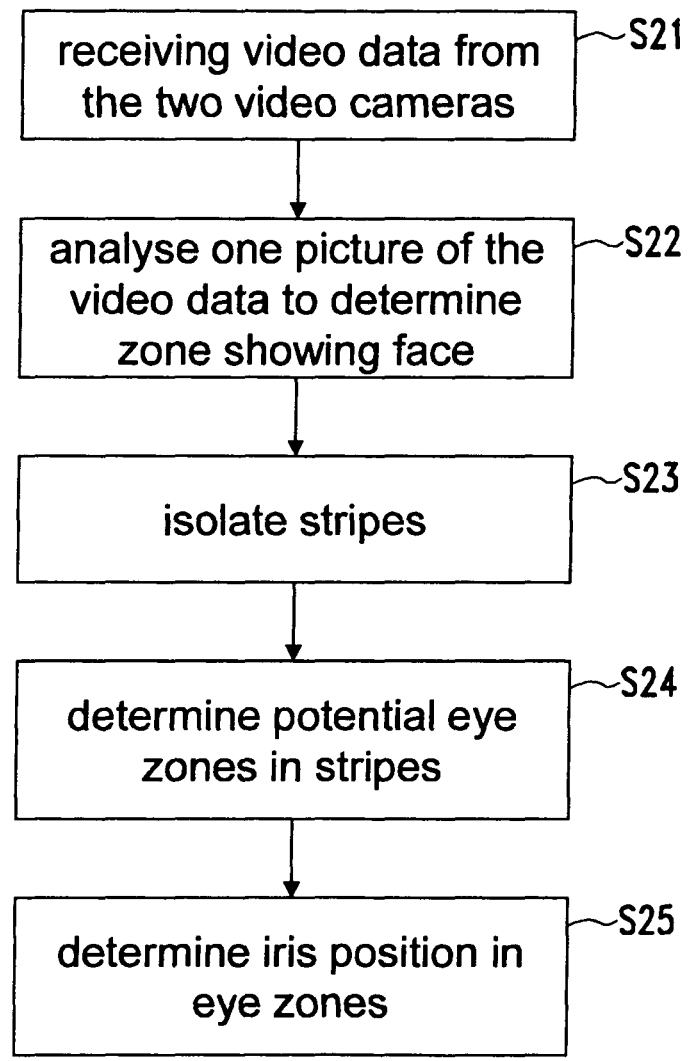
Figure 10A:
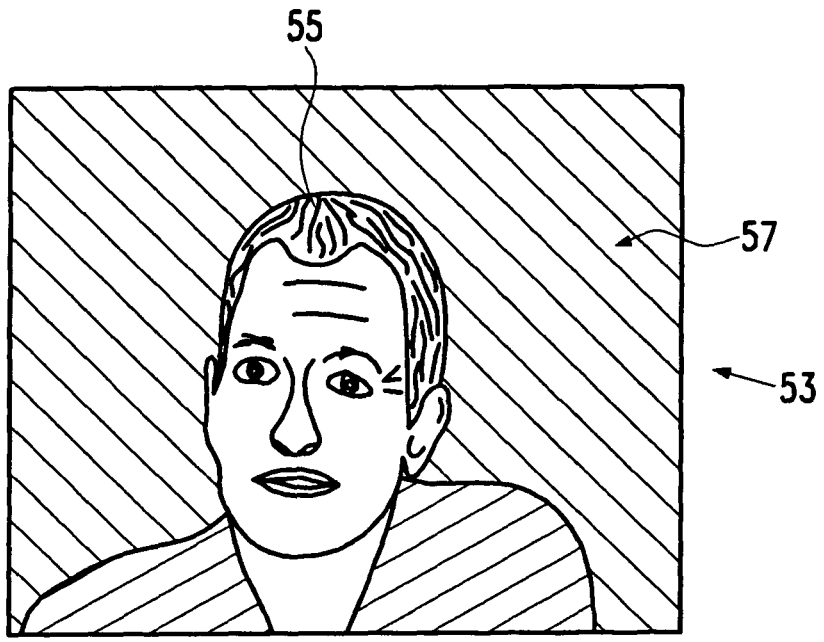
Figure 10B:
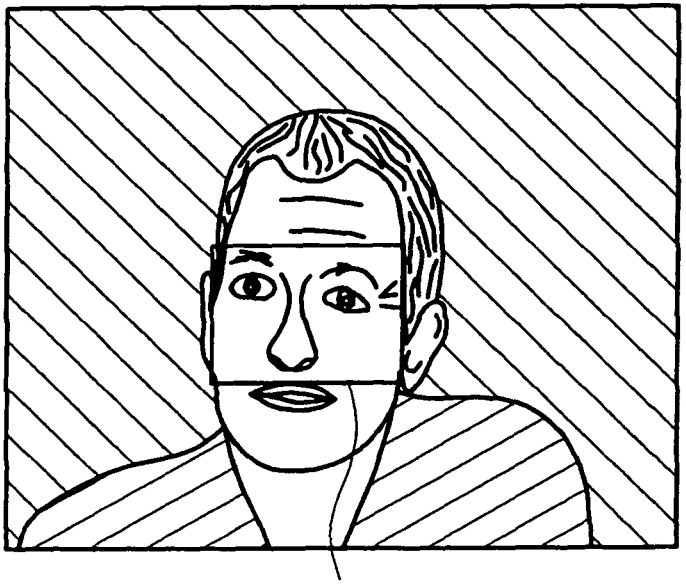
Figure 10C:
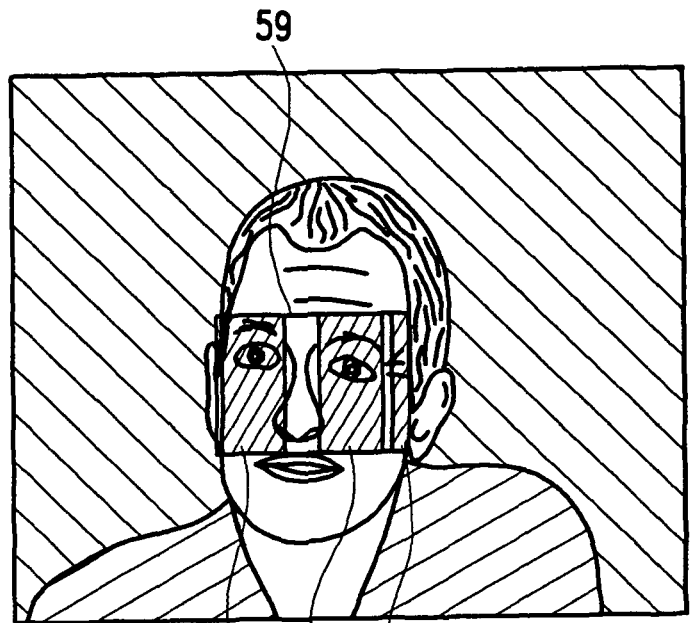
Figure 10D:
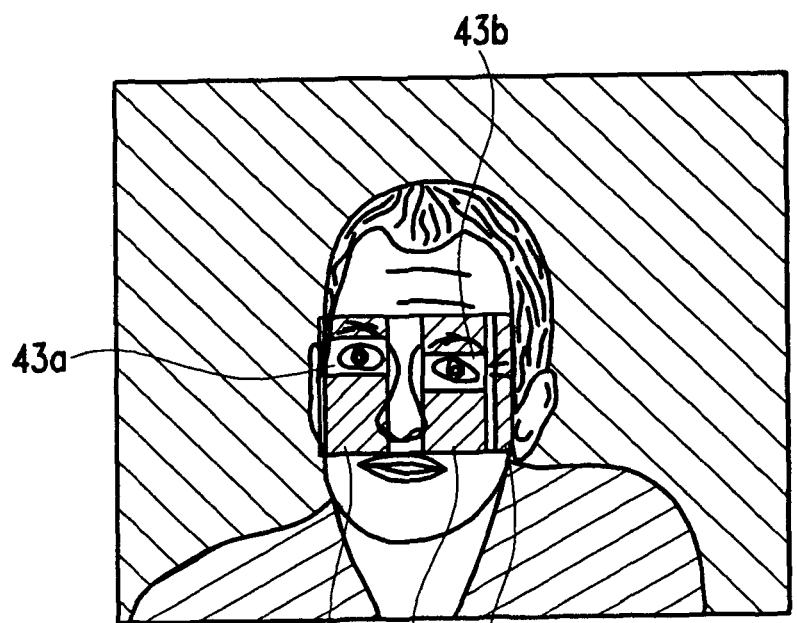
Figure 11:
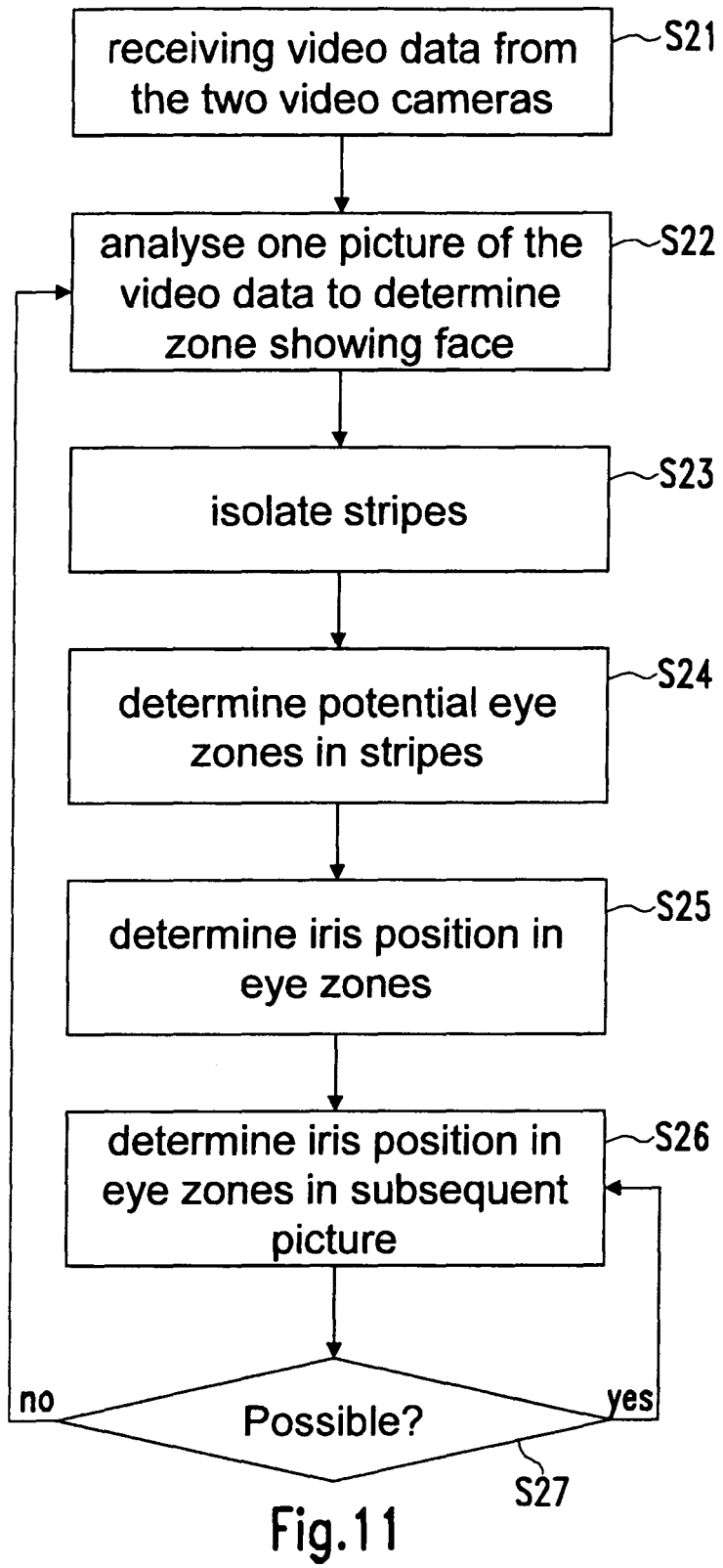
Figure 12:
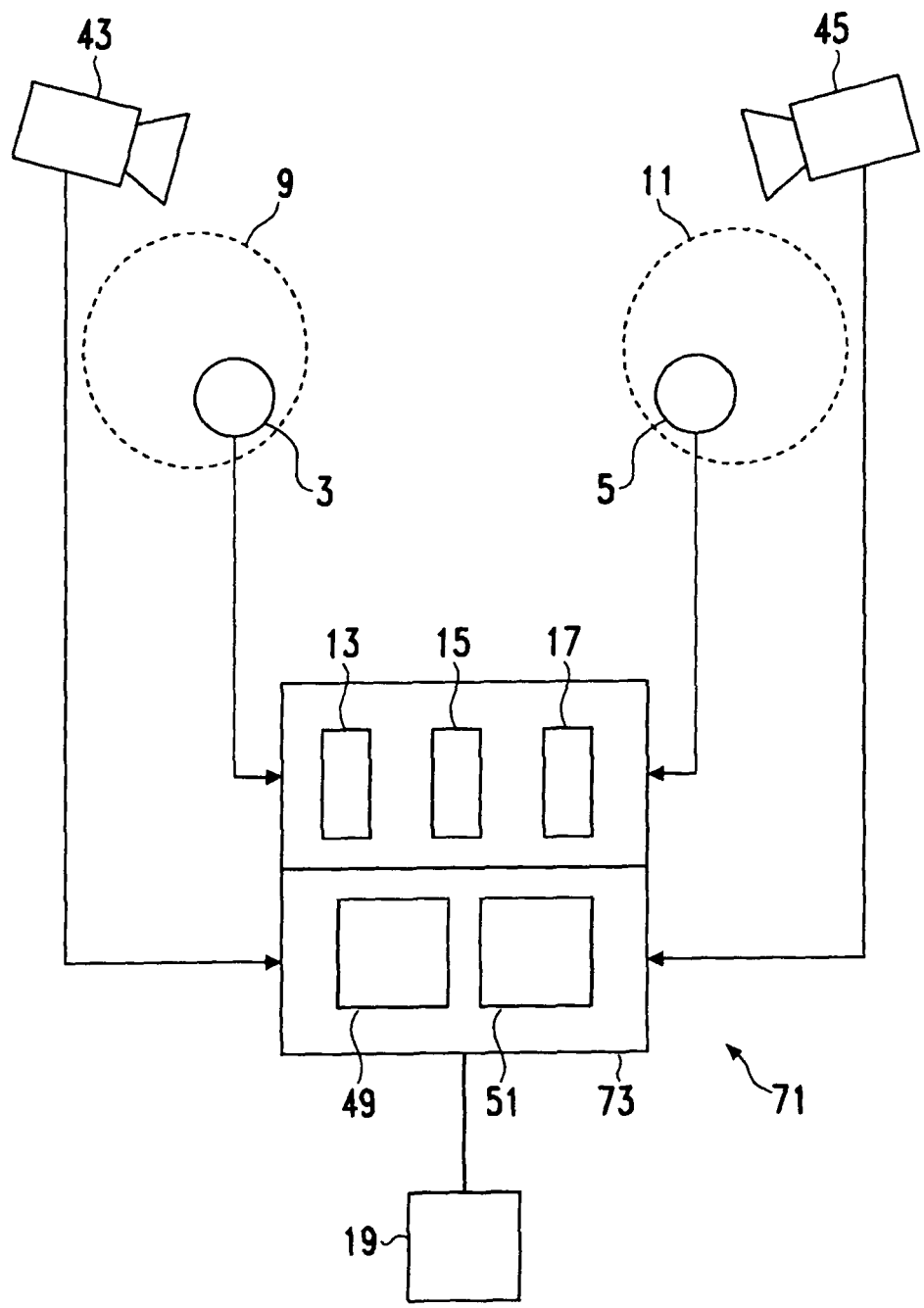

Specific embodiments of the present invention will become more apparent from the present description with reference to the accompanying drawings, wherein FIG. 1 illustrates a first embodiment of a system according to the invention, FIG. 2 illustrates a flow diagram of a method according to a second embodiment of the invention, FIGS. 3a to 3e illustrate various communication patterns occurring during a dialogue, FIG. 4 illustrates a second flow diagram of a method according to a third embodiment of the invention, and FIG. 5 illustrates the principle of detecting interaction phase transitions, FIG. 6 illustrates a third flow diagram of a method according to a fourth embodiment of the invention, FIG. 7 illustrates a system according to the invention according to a fifth embodiment, FIG. 8 illustrates a fourth flow diagram of a method according to a sixth embodiment of the invention, FIG. 9 illustrates a fifth flow diagram of a method according to a seventh embodiment of the invention, FIGS. 10a to 10d illustrate the results of the different steps to identify the position of an eye zone according to the seventh embodiment, FIG. 11 illustrates a sixth flow diagram of a method according to an eighth embodiment of the invention, and FIG. 12 illustrates a system according to the invention according to a ninth embodiment.

In the following, the various embodiments concerning the inventive system for automatically, in particular electronically, evaluating a dialogue between at least two persons and the various embodiments concerning the corresponding method will be exemplified by a sales conversation between a sales person (first person) and a buyer (second person). Of course, the invention is also applicable to automatically evaluating other kinds of conversations, like for example, a job interview etc. Furthermore, all embodiments will be described for two persons having a conversation, however, all embodiments can be extended to dialogues between more than two persons.

FIRST EMBODIMENT

FIG. 1 illustrates the first embodiment of a system for electronically evaluating a dialogue between at least two persons. The system 1 comprises a first and a second microphone 3, 5, which are linked respectively to a processing device 7. The microphones 3 and 5 are arranged close to positions 9, 11 at which the sales person and the buyer can take place. The positioning of the microphones 3, 5 close to the position 9, 11 respectively, ensures that the signal intensity arising from the utterances of the person sitting at the position closest to the microphone, thus position 9 in case of microphone 3 and position 11 in case of microphone 5, is larger than the signal intensity arising from utterances of the person sitting at the other position, but also larger than the background noise. During analysis, the processing device 7 then takes advantage thereof and attributes the captured audio signals unambiguously to either the person sitting at position 9 or the person sitting at position 11. In case more than two persons take part in the conversation, system 1 can be adapted by providing additional microphones.

The data processing device 7 comprises a first processing unit 13, which receives the attributed utterances. The first processing unit 13 is configured to establish, starting from the attribution of the utterances, the repartition in the time domain of the utterances of the two persons in the course of the dialogue. The first processing unit 13 is also configured to compare the results of this analysing step with predetermined communication patterns, defined and described further down, to identify one or more communication patterns in the dialogue, like a sales conversation, between a person sitting on position 9 and a person sitting on position 11 (see also second embodiment).

The data processing device 7 comprises a second processing unit 15 also receiving the respective audio data and which is configured to identify predetermined interaction phases in the course of the dialogue based on a moving average value of the speaking time of one person participating in the dialogue. This moving average value is directly determined out of the audio data, namely the attribution of the utterances carried out by the data processing device 7. The interaction phases and the way they are automatically identified using system 1 will be described further down (see also third embodiment).

As an additional element, the processing device 7 comprises a third processing unit 17, which is configured such that predetermined words can be identified in the utterances of a person sitting on position 9 and/or a person sitting on position 11.

The results obtained by the first processing unit 13, the second processing unit 15 and the third processing unit 17 can be stored in a storage device 19 and/or outputted via a user interface (not shown) to the participants of the sales conversation and/or a third person, like for example a teacher of a seminar.

System 1 according to the invention finds its application in the automatic evaluation of dialogues, like the mentioned sales conversations, by providing a quantitative analysis of the course of the dialogue. This quantitative data supports a user, like for example a teacher of a sales seminar, so that immediately after having recorded the dialogue between two participants, the user has valuable information about the way the participants managed the sales conversation.

According to variants system 1 may not comprise all three processing units, but only one or two.

SECOND EMBODIMENT

FIG. 2 illustrates the way system 1 is used to evaluate a dialogue and furthermore, represents the second embodiment according to the invention, namely a method for automatically, namely electronically, evaluating a dialogue between at least two persons according to the invention and which uses the system 1 of the first embodiment.

Step S1 of the second embodiment consists in receiving audio data captured by the two microphones 3 and 5 of system 1 illustrated in FIG. 1.

Step S2 then consists in analysing this audio data, thus two distinct audio data streams to find out the attribution in the time domain of the utterances of the first and second person. Here, the processing device 7 carries out this analysis.

The attribution of the utterances to respective speakers is based on a filtering of the captured signal intensity in each audio data stream. If the signal is above a certain threshold in the data stream of microphone 3, the first processing unit 13 decides that the person at position 9 is speaking, and in case the signal intensity is below that threshold it is decided that that person is not speaking and that the remaining signal is due to the background noise and/or due to an utterance from the other person sitting at position 11. The same kind of analysis is also carried out for the second data stream coming from microphone 5 and for which, in case the signal is above the threshold, the utterance is attributed to the person at position 11. This method is easy to realise but also reliable, in particular, it is also possible to identify a situation in which both persons speak at the same time.

Once the attribution of the utterances of the two persons in the time domain is established, it becomes possible to extract further information concerning the quality of the conversation between the two persons. First of all, it is possible to determine communication patterns occurring during a dialogue, like a sales conversation. FIG. 3 defines different communication patterns between a sales person and a buyer.

FIG. 3a illustrates the "listening" communication pattern. In this figure, grey blocks illustrate utterances as a function of time (x-axis), whereas the absence of grey blocks indicates that the corresponding person is not speaking. The characteristics of the "listening" pattern, is that the sales person the first person, is silent, whereas the buyer, the second person, speaks.

The second communication pattern (FIG. 3b) represents the "reformulating" pattern. In this pattern, it is essentially the second person, thus the buyer, who talks, whereas the first person intervenes only shortly from time to time. Typically the first person may express his agreement or repeats a key word or groups of key words.

FIG. 3c illustrates the "reacting" pattern. In this pattern, the first person is talking, but the second person interrupts to intervene. Here a situation occurs during which both persons talk and typically the second person continues to talk. In this case, the correct reaction of the sales person, would be to stop talking as quickly as possible to let the buyer express his thoughts.

FIG. 3d represents the "expressing" pattern during which the first person is mainly talking, whereas the second person only intervenes from time to time.

Finally, FIG. 3e illustrates the "silence pattern" during which nobody talks.

A good sales person has to be able to actively use the five different patterns depending on the situation in which he finds himself during a conversation. In case the sales person is proficient in the application of this communication tool, he will be able to up-value the product he tries to sell as a function of the expectancies and the behaviour of his counterpart, the buyer.

To come back to the second embodiment of the invention, having analysed the attribution of the utterances in Step S2, the processing device 7 (first processing unit 13) proceeds during Step S3 to identify the various communication patterns, like defined above. This is achieved by determining the repartition of the utterances between the two speakers, which is based on the attribution determined in Step S2. The repartition of the utterances is then compared with the different model communication patterns.

The corresponding result is used to determine, during step S4, statistics about the number of times each pattern occurs, how long they are or weather during the reacting pattern the time during which the two persons are talking is too long, etc.

If a sales person does not or only badly use one or more of the patterns during his conversations, the user, like a teacher of a seminar, can immediately identify the absence of this communication pattern and indicate that the sales person is not using all the possibilities he has with respect to communication patterns or that improvements can be achieved by adapting the skills.

The results of the analysis Steps S3 and S4 are output to the user (Step S5) via the user interface and/or are stored in the storage device 19 (Step S6), like a database.

THIRD EMBODIMENT

FIG. 4 illustrates a further way system 1 is used to evaluate a dialogue and furthermore, represents the third embodiment according to the invention, namely a method for automatically, namely electronically, evaluating a dialogue between at least two persons according to the invention and which uses the system 1 of the first embodiment.

Here steps S1 and S2 correspond to the ones of the second embodiment. Their description is incorporated herewith by reference.

In this embodiment, the analysis of the attribution of the utterances from the two persons is used to identify a sequence of interaction phases, which is illustrated in Step S7. This analysis is carried out in the second processing unit 15 of system 1.

A sales conversation may typically comprise at least some of the following interaction phases:

I. "Presentation", this phase is a short phase at the beginning of a conversation during which the two persons introduce themselves. Typically, various subjects without a link to the product or service, which is the subject of the sales conversation, are discussed between the two protagonists. In this model, it is the sales person that speaks most.

II. Then, typically, follows the phase of the "discovery of needs" which is longer than the previous phase. In this phase the main person is the buyer who is nevertheless guided by the sales person. The sales person tries to let the buyer express his needs to be in turn capable of proposing a corresponding product or service. In this phase, the information flow is essentially from the buyer to the sales person.

III. Phase III is the "argumentation phase" during which the sales person presents his product, thus it is the sales person who speaks most.

IV. The next phase is the "response to objections phase" during which both persons intervene. The buyer expresses his objections against the product, whereas the sales person responds thereto, and at the same time, identifies in a more precise manner the needs of the buyer. Essentially, the information flow goes back and forward in this phase.

V. Finally, each sales conversation terminates by "conclusions" during which typically the sales person recapitulates shortly the taken decisions.

These phases do not necessarily have to be carried out in this order, and it is of course also possible that one phase is lacking, e.g. in case the proposed product directly corresponds to the expectations of the buyer, phase IV does not occur. The way the phases are organised depends on various parameters, like the industry or a company wants to run its sales conversations. Phase I and V nevertheless always occur, by definition, at the beginning and the end respectively.

Step S7 of the third embodiment then consists in identifying predetermined interaction phases in the course of the dialogue based on a moving average value of the speaking time of one person participating in the dialogue, which has been previously determined in Step S2. The information flow between buyer and sales person characterizes the different phases of the conversation, like explained above. Using the parameter "moving average value of the speaking time", the different phases and their sequence can be automatically and electronically established out of the attribution of speaking time to the one or the other person.

FIG. 5 illustrates the moving average value 21 of the speaking time of a sales person participating in a sales conversation as a function of time. The moving average could, of course, also be determined for the buyer. The x-axis thus corresponds to the time and the y-axis to the moving average value in percent. Best results have been achieved, when the moving average value 21 is calculated over a time duration of about 3% to 10% of the total duration of the dialogue, in particular 5% of the total duration, which is of the order of 10 to 20 minutes.

First of all different phases of a dialogue are identified. This identification is based on the detection of a transition from one phase to the next one.

The second process unit 15 is configured to identify a first moment 23 at which the moving average value 21 passes a first limit value 25, here 65% and a second moment 27 at which the moving average value 21 passes a second limit value 29, here 50%. Once a first and second moment 23, 27 have been identified, the inventive method concludes that a transition between two phases is present at the second moment 27. The analysis continues to identify the next moment 31 at which a second first limit value 33 is passed. Here the second first limit value 33 is 35%. This phase ends by the detection of the next moment 35 at which the second limit value 29 is again passed. In the same way the inventive method identifies the subsequent phases, which end at moments 36, 37 and the dialogue ends at 38.

The first and upper and lower limit values can be adapted to the kind of dialogue to be analysed.

The method then continues with the identification of the various phases: presentation, discovery of needs, argumentation, response to objections and conclusions. First of all two categories of phases are determined. Short phases have a duration of less than 20% and long phases a duration of 20% or more of the total time.

The short phases are then attributed the following way:

If the phase is the first phase and the sales person speaks more or equally than the buyer, the phase is identified as being the presentation phase.

If the phase is the last one and talking time is not balanced, the phase is identified as being the conclusion phase.

If the phase is neither the first nor the last one and the sales person speaks more than the buyer, the phase is identified as being an argumentation phase. If it is the buyer who speaks more, the phase is a discovery of needs phase.

For the long phases an additional parameter becomes necessary to discriminate the argumentation and discovery of needs phases from the response to objections phase. This additional parameter qualifies the average talking time of the considered phase between the two speakers. Three areas are considered for this value. A first area in which the talking time is balanced between the two speakers, a second area in which the sales person speaks more than the buyer and a third one in which the buyer speaks more. The balanced area is qualified by an average talking time of the two speakers near the value of 50%, in particular between 42.5% and 57.5%.

Using this third limit value, the phases are attributed as follows: If the mean value of the speaking time is in the sales person area, the phase is an argumentation phase, if the mean value is the buyer area, the phase is a discovery of needs phase. And in the last case, which is the balanced area, the phase is a response to objections phase during which both participants argue.

Thus taking into account these rules, phase one ending at instant 27, is the presentation phase. The phase two ending at instant 35, is a discovery of needs phase, and indicates that in this phase the buyer talks more, as he describes his needs, response to objections and conclusions. The phase which ends at moment 36 corresponds to an argumentation phase, as here the buyer responds to the needs of the buyer, by indicating the product which suits the buyers needs.

The next phase, ending at moment 37, is the fourth phase and corresponds to an response to objections phase. Finally the last phase, ending with instant 38, is the conclusion phase.

In the case that two interaction phases of the same type have subsequently been identified, the processing unit 15 can, in addition, be configured such, that they are automatically merged into one phase.

Step S8 of the method then consists in analysing the results of the determination of the interaction phases. In case that one or more of these phases lack during the conversation sequence, or that some phases took too long or were too short, a user of system 1 obtains the information that the sales person does not proceed in an optimised way, directly from the system 1 and, as a consequence, can then point towards possible improvements in the communication skills of the persons participating in the dialogue.

The results of the analysis Steps S7 and S8 are output to the user (Step S5) via the user interface and/or are stored in the storage device 19 (Step S6), like a database, just like in the second embodiment.

The second and the third embodiment can advantageously be combined into one process, so that a more complete picture of the dialogue and the communication skills can be obtained. In particular, the use of the various communication patterns in the different interaction phases can be automatically determined and then exploited by the user.

FOURTH EMBODIMENT

FIG. 6 illustrates a fourth embodiment representing a third use of system 1 and a third method for electronically evaluating a dialogue between at least two persons according to the invention. Compared to the second embodiment illustrated in FIG. 2, this method comprises an additional step S9 of identifying predetermined words in the utterances of at least the sales person. According to a variant also predetermined words could be identified in the utterances of the buyer. The other steps, S1 to S4, prior to Step S9 and S5 and S6 after Step S9 correspond to the ones of the second embodiment and are therefore not repeated again, but their descriptions are incorporated herewith by reference.

The predetermined words, typically 20 to 50 specific words, more in particular 30 specific words, identify and/or characterise the product or service to be sold, and furthermore may relate to the professional environment in which the sales conversation is placed. The identification of predetermined words in the utterances of the sales person helps to identify whether or not the sales person uses the correct vocabulary so that in case he does not use the words, adequate measures can be taken, like new product training, to improve the performance of a sales person.

Instead of the second embodiment, the additional step S9 could also be added in the same way to the third embodiment, or the third and the fourth embodiment could be combined, to obtain an even further detailed analysis of the dialogue and the communication skills.

The identification of predetermined words has its importance, as the occurrence of the predetermined words is more or less important depending on the type of interaction phase of the conversation during which they occur or not. The predetermined words defining the product to be sold should be especially used in the "argumentation" and the "response to objections" phases to improve the chance of a successful conversation. Thus, the identification of predetermined words as a function of the interaction phase in which the two protagonists are currently in, plays an important role and points the user of the system and the method, e.g. a teacher, towards possible improvements in case the sales person is not organised in an optimal way.

According to the invention embodiments one to four can also be adapted to a situation in which the persons are not sitting in front of each other, but are having their conversation over telephone. Also in this case the utterances can be attributed and the communication patterns, the communication phases and the use of predetermined words determined.

FIFTH EMBODIMENT

FIG. 7 illustrates a fourth embodiment of the invention, namely a second inventive system for electronically evaluating a dialogue between at least two persons. System 41 comprises two video cameras 43 and 45 for capturing video data showing the at least two persons during their conversation. Like the microphones 3 and 5 of the first embodiment, here the video cameras 43 and 45 are arranged such that video camera 43 captures a person present at position 11 (the same position 11 as in the first embodiment), whereas the second camera 45 captures a person being present at position 9. Preferably, each camera 43, 45 captures only one person at a time to facilitate the data treatment.

The cameras 43 and 45 are each linked with a processing device 47 configured to determine whether a visual interaction between the at least two persons occurs during their dialogue. The processing device 47 comprises a fourth processing unit 49 configured to detect the position of the eyes, in particular the irises, of the persons positioned at positions 9 and 11 to determine whether one person looks at the other one or whether the two persons look at each other. Thus three elements can identify three focalisation states, the sales person looks at the buyer, the buyer looks at the sales person and both look at each other. The presence or absence of the focalisation represents an important parameter characterising the quality of the sales conversation. In the case of an absence of focalisation, the user, here thus the teacher of a sales seminar, of system 41 can point towards that deficiency in the communication skills in particular of the sales person of the dialogue, so that this person can improve its sales techniques.

The processing device 47 can, in addition, comprise a fifth processing unit 51 for analysing micro-movements of the eyes of the at least two persons present at positions 9 and 11. The fifth processing unit 51 is configured to determine the directions of the micro-movements of the eyes of the participants of the dialogue and then further determines whether they are in the same mode. It is known that two persons having a conversation have the tendency to synchronize their micro-movements. If the processing device 47 determines that the two persons are not synchronized, one can point towards that absence and indicate that this kind of interaction is missing during the conversation and the sales person can then be specially trained to also take advantage of this communication channel. Thus a further parameter qualifying the sales conversation between a buyer and sales person, namely the presence or absence of synchronisation, can be automatically and electronically detected and output to the user of system 41.

Like in the first embodiment, also system 41 can comprise a storage device 19 and a user interface (not shown) informing about the analysing results of the fourth and fifth processing unit 49 and 51.

SIXTH EMBODIMENT

FIG. 8 illustrates the way system 41 of the fifth embodiment is used to obtain visual interaction information and furthermore, represents the sixth embodiment according to the invention, namely a method for electronically evaluating a dialogue between at least two persons according to the invention and which uses the system 41 of the fifth embodiment. Also, the sixth embodiment will be described for a sales conversation between two persons. Here the first, e.g. the sales person, has taken seat at position 9, and the second person, the buyer, at position 11. Thus camera 43 captures video data of at least a part of the face of the buyer and camera 45 captures video data from at least a part of the face of the sales person.

The method according to the sixth embodiment starts with Step S11, namely the reception of the video data captured by the two video cameras 43 and 45 by the processing device 47.

Step S12 then consists in analysing the video data by the fourth processing unit 49 to determine whether a visual interaction, thus focalisation and/or synchronisation as described above, occur during the sales conversation.

According to the invention, the analysis of the video data thus comprises a first step of determining whether focalisation, thus whether the two protagonists look at each other, is present (Step S13) and/or comprises a second step of determining whether synchronisation, thus whether the micro-movements of the eyes of the two protagonists are in the same mode, is present (Step S14).

The results of this analysis providing an electronically and automatically determined evaluation of the non-verbal interaction between sales person and buyer, are output to a user via a user interface (Step S15) and/or stored in the storage device 19 (Step S16).

Like embodiment one to four, also the fifth and sixth embodiments are used to automatically and electronically obtain an evaluation of a dialogue, like the described sales conversation. However, in this case the parameters analysed relate to a non-verbal interaction. The non-verbal interaction is a parameter which should be taken into account as, for example, a sales person not looking at his counterpart does not realise an optimised sales conversation, even if there are situations in which it is not necessary to look at the other person, in particular in case of writing down notes or during a pronounced concentrated phase in which the sales person listens to the buyer. These situations represent exceptions, which usually occur only during a short period. Apart from the focalisation parameter, the visual interaction analysis can also electronically and automatically provide information about the presence and absence of synchronisation between the micro movements of the eyes of the two protagonists.

SEVENTH EMBODIMENT

FIG. 9 illustrates a seventh embodiment of the invention, namely a method for electronically detecting the position of the eyes of a person in video data comprising a plurality of subsequent pictures. The method is particularly suited to detect the position of the irises and thus describes in detail steps S12 and S13 of the sixth embodiment. Furthermore, the method, just like the one of embodiment six, starts with receiving video data captured by the two video cameras 43 and 45 (Step 21). FIG. 10a illustrates a picture 53 of the head of person 55 from a video data stream captured by camera 43. To facilitate the data analysis the background 57 behind the person is of a colour different to skin colour. It has to be mentioned, that the method according to the seventh embodiment can also be realised with only one video camera capturing the face of only one person.

Step S22 then consists in determining a zone in one picture of the video data stream provided by the video camera, which is susceptible to contain at least a part of the face of the person analysed. In this embodiment, the determination of the zone showing the face or a part of the face is based on the exploitation of a mask applied to the picture data, to extract that part of the picture, which shows skin colours. Providing a background behind the position 9 or 11, which does not show skin colours, facilitates this part of the analysis. In case the analysing step provides a plurality of zones having skin colour, the biggest zone is chosen, as the camera 43 and/or 45 are arranged and configured such that the taken pictures essentially only capture the head of a person and some background, which is not of skin colour. To improve the result, the picture can be re-treated several times in the same way. FIG. 10b illustrates this fact in the practical example. The square 59 is the connected zone of skin colour susceptible to contain the eye zone.

The next Step S23 consists in carrying out a detailed study of the previously determined zone containing the face of the person filmed, in order to isolate stripes susceptible to contain the eyes of the person filmed. The data treatment to determine the stripes is carried out as follows: A vertical or horizontal profile of the intensity or the colour of the pixels defining the zone is taken. Then the maximum value of the profile is determined and local maxima are removed by smoothing the profiles. In the following, intensity valleys are searched for, wherein an intensity valley corresponds to pixels, which have a value less than a predetermined limit value which in turn is determined as a function of the maximum value previously identified in the zone or the corresponding vertical or horizontal stripe. Valleys in the profiles can actually be due to the presence of the eyes leading to holes in the colour mask. In case such a valley is found in one profile, the neighbouring profiles are then examined to search for corresponding valleys which lead to connected structures. The profiles belonging to such connected structures then define one stripe susceptible to contain an eye of the person filmed. FIG. 10c illustrates the result of this step and shows three stripes 61a, 61b, 61c, which could comprise the eyes of the person. The stripe 61c to the right has an intensity valley at the position of wrinkles present close to the right eye.

If for one picture of the video data stream only one stripe is found, it is automatically concluded that it is not possible to identify the positions of the two eyes of the person filmed. The process stops with Step S23 and the next picture of the video data stream is analysed by again starting with Step S21.

The process can be improved by providing further variants. Connected structures found in the zone but being too small can be eliminated, connected structures lying close to each other can be combined and/or connected structures which are too big can be divided into two, leading to two stripes. It is also a possibility to enlarge a stripe in case the connected structures are relatively small but still large enough to eventually comprise the eye of a person.

Once stripes susceptible to contain the eyes of a person are isolated, the next step S24 consists in searching for eye zones inside the regions of the stripes in case that more than one stripe has been isolated in the previous step. In this embodiment, a contour map of the grey-scale image within each stripe is computed. The potential location for the centre of the iris in each candidate stripe is then found by examining the intersections of segments drawn along the radius of the osculating circles for all points of the contour. The point around which those segments tend to intersect most is supposed to be the centre of the iris in the stripe, since the iris is the facial feature with the most circular contour. The number of intersections for this centre is an indication of the quality of the detection. Furthermore, the likelihood that this point is the centre of the iris increases as the grey level in the image at that point is darker because the iris is black. The number of intersection can therefore be weighted by the grey level value.

In case more than two stripes where extracted in the previous step, the least probable candidates are those with the lowest weight and can therefore be eliminated. The eye zone for each of the two remaining stripes is then defined as a frame of predetermined dimensions, which is large enough to contain all eyes in the entire video, and centred around the candidate point retained. FIG. 10d represents the result of this step in the practical example. In stripes 61a and 61b eye zones 63a and 63b have been identified whereas in stripe 61c, the candidate centre weight was too low compared to the formers.

Once the eye zone in a stripe has been identified, the next step S25 then consists in determining the iris position inside the eye zone using the same kind of algorithm, however, only inside the detected eye zone.

In doing so, the quality values resulting from the detection process are intrinsically normalized with regard to the zone dimensions, all zones have the same size. It is thus possible to later compare the results obtained for different frames in the video.

Once the iris position has been established for two persons filmed by a system like system 41, it becomes possible to determine whether the two persons look at each other or not. This is due to the fact that the video camera positions are fixed so that, by knowing the position of the iris in a picture, the processing device 47 can determine whether the positions of the irises of the two persons corresponds to a situation in which the two persons look at each other. In a specific variant of this embodiment, the detection of the iris obtained for each image can be used to determine the sequences in the video where the person was looking at his or her interlocutor. In a simplified variant of this embodiment, the fact that the eyes of a person were identified, is sufficient to conclude that that person looks at the other person, and in case for both persons the eyes have been identified, it can be concluded that they look at each other.

In addition, having analysed the position of the iris and of the eye itself, the micro movement of the eye can be determined for each person. Namely whether the movement of the iris is into one of the following six directions of the eye: upper left, upper right, left, right, downwards left and downwards right. In case both persons show the same behaviour, it is then concluded that they are in synchronisation.

EIGHTH EMBODIMENT

FIG. 11 illustrates an eighth embodiment representing a further method for electronically evaluating a dialogue between at least two persons. In addition to steps S21 to S25, which are the same as in the seventh embodiment, this embodiment comprises the additional steps S26 and S27, which allow to further speed up the process of determining the position of the iris in a picture frame of the video data. After having determined the iris position in the eye zones of a first picture (Step S25), the processing device 47 proceeds with the analysis of the next picture frame of the video data, but does not restart with identifying the zone showing the face in Step 22, but starts immediately to re-determine the iris position in the zone which corresponds to the position at which the eye zone was identified in the previous picture frame. Eventually according to a variant, this zone could be enlarged to improve the chance of finding the iris.

In fact, in this embodiment one takes advantage of the fact that during the sales conversation, the position of the head and thus of the eyes is not moving so fast, so that chances are high that in the subsequent pictures the iris can be found at positions similar to where it has been in the previous picture without having to repeat steps S22 to S24.

In case that it has been determined during Step S27 that indeed the iris has been found in the subsequent picture during Step S26, Step S26 is again carried out for the next following picture without passing by Steps 22 to 25. If, however, the processing device 47 cannot identify the iris in the eye zone during Step S26, the method according to the eighth embodiment then restarts with Step S22, just like in the previous embodiment.

NINTH EMBODIMENT

FIG. 12 illustrates a third system according to the invention according to a ninth embodiment of the invention. The system 71 corresponds to a combination of systems 1 and 41 according to the first and fifth embodiments of the invention. Thus—using the same reference numerals as with respect to the first and fifth embodiment—it comprises two microphones 3, 5, two video cameras 43 and 45, which are each linked to a processing device 73 comprising the first to fifth processing units 13, 15, 17, 49 and 51 and which are configured to analyse both the audio data and the video data received from the microphones and the video cameras. The detailed description of these elements will not be repeated again, but is incorporated herewith by reference to the first and fourth embodiments. Like mentioned above, in case more than two persons take part in the conversation, the system 71 can be adapted accordingly by providing the corresponding number of microphones and/or video cameras.

In addition, system 71 can furthermore comprise a storage device 19 and/or a user interface (not shown), like in the previous embodiments. With this system, the above-described methods can be carried out in combination. Thus, the two persons dialoguing can be automatically and electronically evaluated based on their verbal interaction as well as on their non-verbal interaction.

In addition, in this embodiment, advantage can be taken from synergies between the information extracted out of the audio data and the video data. It becomes possible to analyse the focalisation and/or the micro-movements of the eyes as a function of the interaction phases occurring during the sales conversation.

Looking at both the parameter "repartition of utterances" and the parameter "focalisation", provides a first measure of the synchronisation between two persons, thus a state in which a common behaviour is present which might be beneficial for the outcome of the conversation. If, for example, the buyer does not look at the sales person (non focalisation of the buyer) when he is speaking, but looks at the buyer when he is listening and if the buyer adopts the same way, both are in a synchronized state. Both participants thus adopt a common behaviour. Thus even if both persons do not look at each other, the inventive method can identify a state of synchronisation being advantages for the outcome of the dialogue, e.g. if the buyer is a shy person, not daring to look at the other person, he also finds it better if the other person renounces from looking at him.

In case that focalisation is absent, it becomes of interest to analyse the micro-movements, as a kind of synchronisation is also obtained in case the micro movements of both are in the same mode. In addition, the micro-movement of the eyes of each person is analysed during the first and/or second phase of the dialogue, thus the "presentation" and/or "discovery of needs" phases. During the following three phases, the system 71 determines whether a synchronisation of the micro-movements between the two persons occurs or whether each of the persons stays with its own micro-movement mode.

The data obtained about the synchronisation capabilities of the sales person, allow quantifying the capability to adapt. Typically a person repeats the same verbal and non-verbal modes. A correct communication training, however, allows to adapt to the mode of the buyer. Thus with the inventive method and device such an analysis can be put on a quantitative basis.

It is also possible to check the focalisation as a function of the different phases so that the user of system 71 can obtain even more information about the way the sales conversation between the two persons has been carried out.

Preferably, the processing device is configured such that all the analysing is carried out on the fly, e.g. the position of the iris is calculated between two pictures so that a real time analysis becomes possible. This has the advantage that at the end of the dialogue the user immediately obtains the data about the verbal and non-verbal interactions between the two persons and can determine the profile of the sales person.

Preferably, each of the systems 1, 41 and 71 can furthermore comprise a database with predetermined profiles and by comparing the results of the analysis of the verbal and non-verbal interaction between the sales person and the buyer with verbal and non-verbal interaction properties of predetermined profiles, the systems can output the predetermined sales person profile which best suits the evaluated person. By doing so the evaluated test person can be directed to special training measures to improve his communication skills and can therefore improve his chances to successfully finalise sales conversations.

The methods described above can all be realised as a computer program and put on a computer program product, comprising one or more computer readable media having computer executable instructions to perform the described steps. According to the invention a storage medium can be used for storing the computer program.

The invention claimed is:

1. A method for automatically, in particular electronically, evaluating a dialogue between at least two persons, comprising:
   receiving a video data stream showing the at least two persons at least partially, and analyzing the video data stream to determine whether a visual interaction between the at least two persons occurs during the dialogue, comprising determining whether the at least two persons look at each other by detecting the position of at least a portion of an iris of an eye of each of the at least two persons, and
   analyzing movement of the at least a portion of the iris of the eye for each of the at least two persons to determine whether the movements of the eyes of the at least two persons are in a synchronized state with each other,
   wherein analyzing the movements includes analyzing the movement of the at least a portion of the iris into one of the six directions of the eye: upper left, upper right, left, right, downwards left and downwards right, to determine if the movements of the eyes of the at least two persons are in the synchronized state.

2. The method according to claim 1, wherein analyzing the movement of at least a portion of the eyes further comprises:
   determining whether the movements of the eye are in the synchronized state in at least one predetermined interaction phase.

3. The method according to claim 1, wherein analyzing the video data stream further comprises: identifying visual features in a picture of the video data stream to determine the zone of the picture showing at least a part of the face of at least one of the two persons,
   isolating stripes, in particular vertical stripes, in the zone, and
   searching for eye zones in the stripes if more than one stripe has been isolated.

4. The method according to claim 3, wherein the step of isolating stripes further comprises:
   identifying contours in the stripes by transferring the stripes in a grey-scale format and searching candidate centers of the determined contours by searching for circles susceptible to correspond to the iris by weighting the grey scale intensity in the video data stream in the contours with a predetermined color.

5. The method according to claim 3, further comprising:
   identifying the position of at least a portion of the iris in an eye zone, by searching for circles susceptible to correspond to the iris by weighting the grey scale video data stream in the contours with a predetermined color.

6. The method according to claim 5, wherein the step of searching for circles susceptible to correspond to the iris is repeated to identify the position of the iris in an eye zone, unless no iris position is detectable.

7. The method according to claim 1, wherein the video data stream comprises a plurality of data streams from different cameras located at different positions with respect to the persons participating in the dialogue.

8. The method according to claim 7, wherein each camera captures only one person.

9. A system for automatically, in particular electronically, evaluating a dialogue between at least two persons, comprising:
   at least one video camera for capturing a video data stream showing the at least two persons at least partially and during the dialogue, and
   a processing device coupled to the at least one video camera and configured to determine whether a visual interaction between the at least two persons occurs during the dialogue,
   wherein the processing device is further configured to detect a position of at least an eye of a person in the video data stream comprising a plurality of subsequent pictures by identifying visual features in a picture of the plurality of subsequent pictures, and to determine a zone of the picture showing at least a part of a face of the person by isolating vertical stripes in the zone, and by searching for one or more eye zones in the vertical stripes if more than one of the vertical stripes has been isolated,
   wherein the processing device is further configured to detect a position of at least an eye for each of the at least two persons, and to identify whether movements of the eyes of the at least two persons are in a synchronized state with one and other, and
   wherein for each of the eyes the processing device is configured to determine the movement of the eye into one of the following six directions of the eye: upper left, upper right, left, right, downwards left and downwards right, to determine if the movements of the eyes of the at least two persons are in the synchronized state.

10. The system according to claim 9, wherein for each person participating in the dialogue one video camera is provided, and wherein the video cameras are arranged such that each camera captures only one person.

11. The method according to claim 1, further comprising a computer program product, wherein one or more computer readable media has computer-executable instructions for performing the steps of the method.

* * * * *